United States Patent
Brady et al.

(10) Patent No.: US 7,283,232 B2
(45) Date of Patent: Oct. 16, 2007

(54) OPTICAL SPECTROSCOPY WITH OVERLAPPING IMAGES

(75) Inventors: David J. Brady, Durham, NC (US); Michael E. Gehm, Durham, NC (US); Evan C. Cull, Durham, NC (US)

(73) Assignee: Duke University, Durham, NC (US)

( * ) Notice: Subject to any disclaimer, the term of this patent is extended or adjusted under 35 U.S.C. 154(b) by 23 days.

(21) Appl. No.: 11/422,197

(22) Filed: Jun. 5, 2006

(65) Prior Publication Data

US 2006/0274308 A1 Dec. 7, 2006

Related U.S. Application Data

(60) Provisional application No. 60/687,439, filed on Jun. 6, 2005, provisional application No. 60/792,118, filed on Apr. 14, 2006.

(51) Int. Cl.
*G01J 3/28* (2006.01)

(52) U.S. Cl. ........................................ 356/326

(58) Field of Classification Search .................. None
See application file for complete search history.

(56) References Cited

U.S. PATENT DOCUMENTS

| | | | |
|---|---|---|---|
| 4,995,724 A | 2/1991 | Sonobe et al. | |
| 4,997,281 A | 3/1991 | Stark | |
| 5,559,597 A | 9/1996 | Battey et al. | |
| 5,627,639 A | 5/1997 | Mende et al. | |
| 5,657,121 A | 8/1997 | Nishina | |
| 5,965,875 A | 10/1999 | Merrill | |
| 6,717,668 B2 | 4/2004 | Treado et al. | |
| 6,737,652 B2 | 5/2004 | Lanza et al. | |
| 6,995,840 B2 * | 2/2006 | Hagler | 356/310 |
| 7,061,606 B2 * | 6/2006 | Treado et al. | 356/301 |
| 7,253,897 B2 * | 8/2007 | Moon et al. | 356/328 |
| 2004/0070755 A1 | 4/2004 | Fuhrmann et al. | |

* cited by examiner

*Primary Examiner*—Tu T Nguyen
(74) *Attorney, Agent, or Firm*—Coats & Bennett, P.L.L.C.

(57) ABSTRACT

An optical spectrometer distinguishes ambiguity between different wavelength constituent components present in incident light. A spatial filter in the spectrometer spatially filters the incident light. A dispersion system receives the spatially filtered light and disperses images of the spatial filter in a wavelength dependent fashion such that two or more wavelength-specific images at least partially overlap at a detector system. The detector system comprises a detector array and processor that detects and processes the dispersed light to remove ambiguity between one or more of the overlapping images. The detector array may detect coded aperture images associated with a coded aperture spatial filter defined by a coded aperture function, and the processor may process the detector array output signals using an analysis function that complements the coded aperture function. The detector system may filter the spatial filter images and electronically process the resulting detector array output signals.

56 Claims, 12 Drawing Sheets

FIG. 13

OPTICAL SPECTROSCOPY WITH OVERLAPPING IMAGES

This patent claims priority from U.S. Provisional Application No. 60/687,439, filed 6 Jun. 2005, and U.S. Provisional Application No. 60/792,118, filed 14 Apr. 2006, both of which are incorporated herein by reference.

BACKGROUND

The present invention relates generally to optical spectrometers, and more particularly to compact optical spectrometers.

Optical spectrometers isolate individual wavelength components of light radiated from a source to measure wavelength-specific properties of the source. Scientists use optical spectrometers to analyze characteristics of various specimens, such as geological samples, biomedical samples, etc. Typically, a spectrometer includes a spatial filter, a grating, and a detector array. The spatial filter spatially filters the incident light radiated from the source, while the grating spatially shifts the direction of the spatially filtered light as a function of wavelength. In so doing, the grating directs different wavelength components of the spatially filtered light to different areas of the detector array. Detector elements in the detector array convert sensed light to an electrical output signal. Processing electronics process the output signals to generate the spectrum to quantify wavelength-specific properties of the source.

Conventional gratings accommodate a wide spectral range, and therefore, shift the various wavelength components of the spatially filtered light across a physically wide detector area. Because they use gratings that shift all of the wavelengths along a single direction, conventional spectrometers require physically wide detector arrays to accommodate the spatially wide range of dispersed light. This results in undesirably large spectrometers. Other designs, such as the spectrometer described in U.S. Pat. No. 5,559,597 to Battey et al., handle the wide range of dispersed light by folding different portions of the optical spectrum onto different non-overlapping rows of a detector array. While the Battey device reduces the width requirements for the detector array, the described solution is not ideal for all circumstances. Therefore, there remains a need for alternative spectrometers.

SUMMARY

The present invention provides a spectrometer that overlaps images associated with different wavelength constituent components present in incident light radiated by a source, and then removes the detection ambiguity resulting from the overlap. The spectrometer includes a spatial filter, a dispersion system, and a detector system. The spatial filter spatially filters the incident light. The dispersion system disperses images of the spatial filter in a wavelength dependent fashion onto the detector system such that first and second sets of images from first and second spectral subsets, respectively, are both dispersed in a first direction but shifted relative to each other in a second direction. As a result, two or more spatial filter images associated with different spectral subsets at least partially overlap at the detector system, advantageously with a vertical overlap.

The detector system includes a two-dimensional detector array operatively connected to a processor. The detector array generates output signals corresponding to the detected spatial filter images. The processor processes the output signals corresponding to one or more of the detected images to remove ambiguity between signals associated with different overlapping images. According to one exemplary embodiment, the spatial filter takes the form of a coded aperture that spatially filters the light according to a coded aperture function, and the dispersion system two-dimensionally disperses the images in a wavelength-dependent fashion. For this embodiment, the processor removes the ambiguity by applying an analysis function to the output signals, where the analysis function complements the coded aperture function. According to another exemplary embodiment, the detector system filters the light incident on the detector array to remove the ambiguity of the overlapping images. The processor individually analyzes the one or more detector output signals associated with the detected light to generate spectrum outputs associated with the spectral subsets of each filter, and combines the multiple spectrum outputs to produce a combined spectrum output. For this embodiment, the first and second sets of images may fully overlap at the detector system. Corresponding methods are also described.

BRIEF DESCRIPTION OF THE DRAWINGS

FIG. 13 shows one exemplary detector array for the detector system of FIG. 9.

DETAILED DESCRIPTION

Figure 1:
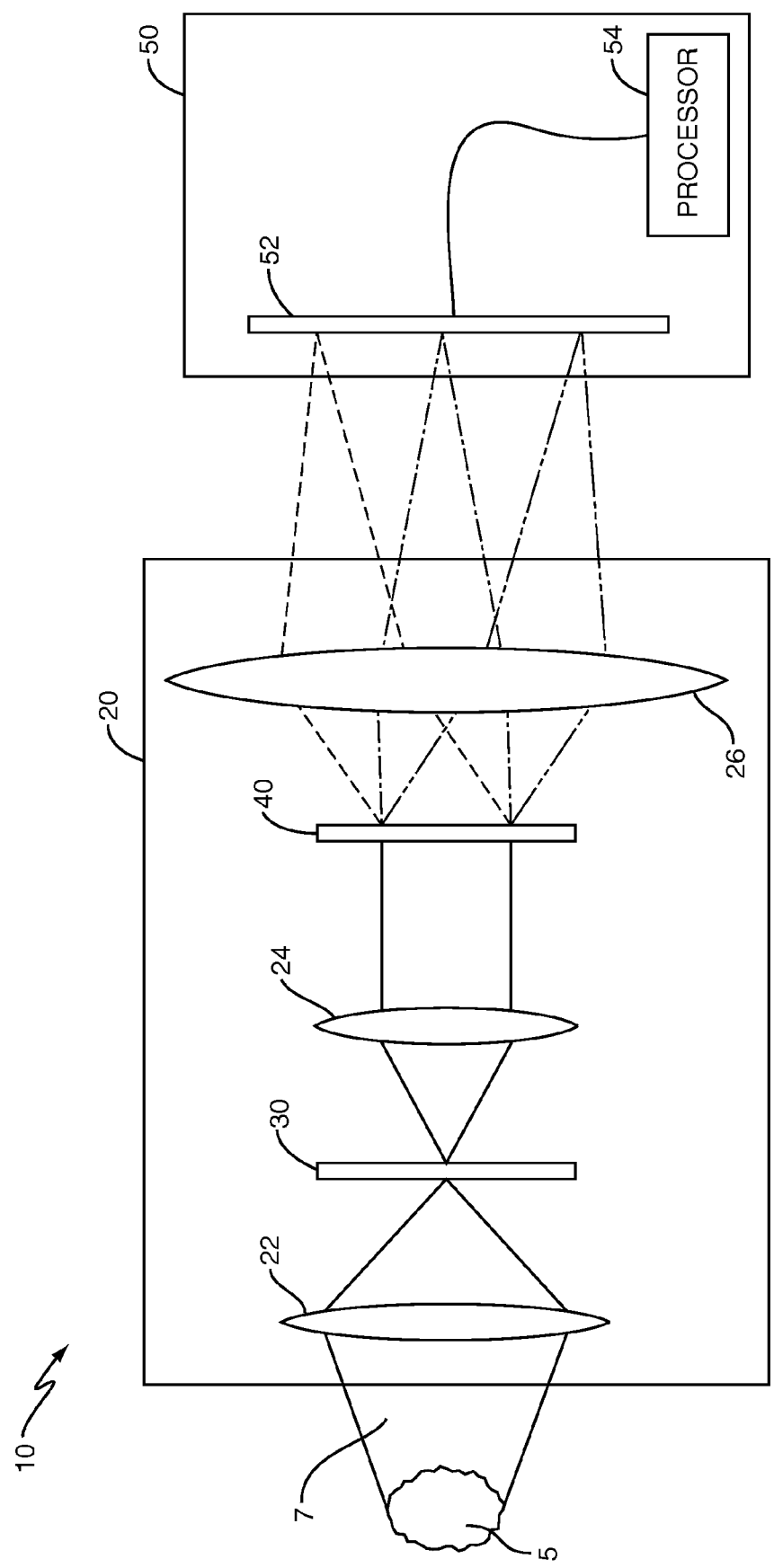
FIG. 1 shows a side view of one exemplary optical spectrometer.

An optical spectrometer 10 according to the present invention utilizes a spatial filter 30 to filter incident light 7 radiated from a source 5. Components of an optical system 20 manipulate the filtered incident light to illuminate a detector system 50 with spatial filter images associated with different wavelength components of the spatially filtered light. The size of the required detector system 50 may be reduced because different images of the spatial filter 30 associated with respective different wavelengths overlap in at least one direction. The detector system 50 detects and disambiguates the overlapping images to generate the spectral information associated with source 5.

FIG. 1 illustrates an optical spectrometer according to one exemplary embodiment of the present invention, generally indicated at 10. Spectrometer 10 includes an optical system 20 and a detector system 50. Optical system 20 includes a spatial filter 30, one or more lens systems 22, 24, 26, and a dispersion system 40. Spatial filter 30 spatially filters the incident light 7. An optional collection lens system 22 may be used to collect the incident light 7 radiated from the source 5 and to focus it onto spatial filter 30, if desired. A first imaging lens system 24 collimates the filtered light from the spatial filter 30 and passes the filtered light to dispersion system 40. The dispersion system 40 disperses the collimated light according to the light's constituent wavelength components. A second imaging lens system 26 focuses the dispersed light onto the detector system 50. Operatively, first and second imaging lens systems 24, 26 help image the spatial filter 30 at detector system 50, while dispersion system 40 helps position the images of the spatial filter 30 associated with different wavelengths on overlapping portions of detector system 50.

Detector system 50 detects the spatially filtered and dispersed light and distinguishes the overlapping images to determine wavelength-specific information about the incident light 7. Detector system 50 comprises a two-dimensional detector array 52 operatively connected to a processor 54. Two-dimensional detector array 52 advantageously takes the form of an orderly array of individual detector elements 58 arranged in columns and rows. The detector elements 58 in detector array 52 sense the intensity of the light incident on the detector array 52 and convert the detected intensity into an output signal, i.e., an output voltage. The detector array 52 provides each detector element's output signal to processor 54. Processor 54 processes one or more of the detector output signals to determine wavelength-specific information about source 5 from the detected light. In one embodiment, processor 54 processes the detector output signals using an analysis function that complements a coded aperture function associated with a coded aperture spatial filter 30 to distinguish the wavelength-specific information associated with the overlapping images. In another embodiment, detector system 50 uses optical filters and mathematical processing to distinguish the wavelength-specific information associated with the overlapping images. In either case, the optical spectrometer 10 described herein distinguishes overlapping images corresponding to different wavelengths.

As discussed above, dispersion system 40 disperses the spatially filtered light onto detector system 50 such that spatial filter images associated with wavelengths in different spectral subsets of a spectral range fold onto the detector system. As discussed further below, in some embodiments, the multiple folds of the dispersed light partially overlap, while in other embodiments, the multiple folds of the dispersed light fully overlap. While the following describes dispersion system 40 in terms of a multiple order or multi-mode dispersion system, the present invention is not limited to multiple order or multi-mode dispersion systems.

Figure 2A:
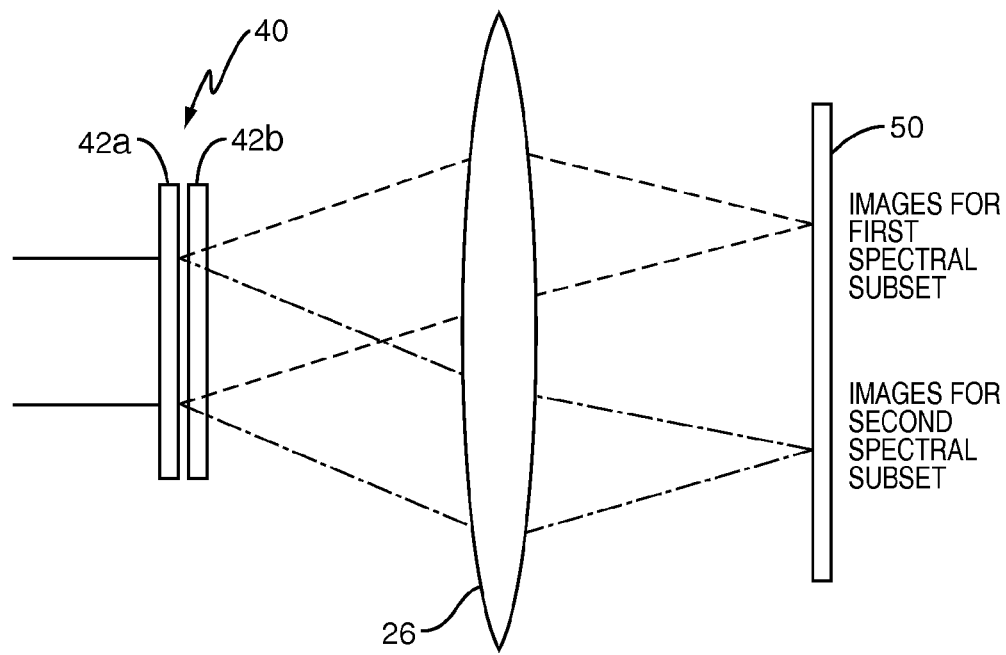
FIGS. 2A and 2B show exemplary dispersion systems for the optical spectrometer of FIG. 1.
Figure 2B:
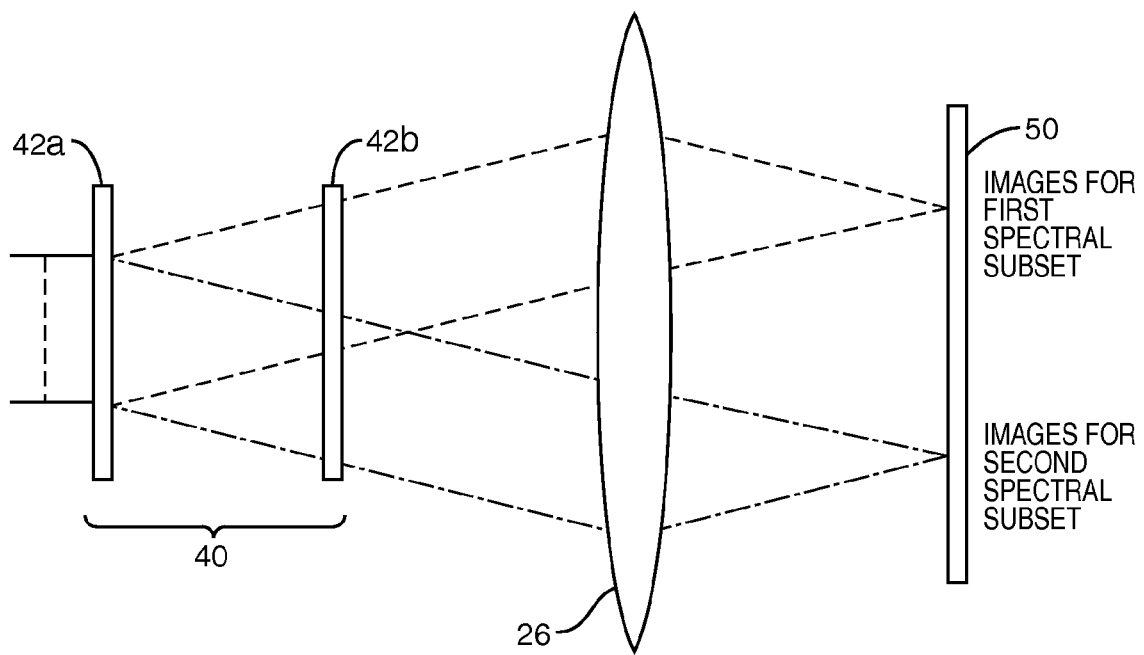

Exemplary dispersion systems 40 include stacked dispersive holograms, shown in FIG. 2A, and spaced dispersive holograms, shown in FIG. 2B. The illustrated dispersion systems 40 include two dispersive elements 42a, 42b that collectively disperse wavelength components of the spatially filtered light. Each dispersive element 42a, 42b disperses different spectral subsets of a predetermined spectral range onto detector system 50 along two or more overlapping paths. Each spectral subset includes one or more chromatically arranged wavelengths of the predetermined spectral range. In both illustrated dispersion systems 40, the first dispersive element 42a disperses light associated with wavelengths in a first spectral subset along a first path in a first direction, and passes the light associated with wavelengths in a second spectral subset. Similarly, the second dispersive element 42b passes the light associated with the wavelengths in the first spectral subset, and disperses the light associated with wavelengths in the second spectral subset along a second path in the first direction, where the second path overlaps at least a portion of the first path in a second direction. Thus, the images may overlap in one or more directions. In one embodiment, the second direction is perpendicular to the first direction. For example, the images may vertically overlap and/or horizontally overlap. As used herein, "horizontal overlap" refers to overlap between spatial filter images within a single spectral subset, while "vertical overlap" refers to overlap between spatial filter images in different spectral subsets.

It should be noted that, for clarity, FIGS. 2A and 2B use point images to illustrate the multiple order dispersion achieved by dispersion system 40. However, as shown in FIGS. 3 and 4, the dispersion system 40 of the present invention disperses two-dimensional images associated with different wavelengths onto overlapping areas of detector system 50, as discussed further below.

The multiple order dispersion provided by dispersion system 40 of FIGS. 2A and 2B may also be referred to as multi-mode dispersion. FIG. 3 illustrates an exemplary detector system 50 illuminated with this arrangement when spatial filter 30 comprises a coded aperture spatial filter 30. As shown in FIG. 3, the first dispersive element 42a disperses a first set of spatial filter images 56a, 56b, 56c associated with a $\lambda_1$, $\lambda_2$, and $\lambda_3$ spectral subset along a first direction. The second dispersive element 42b disperses a second set of spatial filter images 56d, 56e associated with a $\lambda_4$ and $\lambda_5$ spectral subset along the first direction but offset from the first set in a second direction such that the images 56 in the second set overlap the images 56 in the first set in the second direction.

Figure 3:
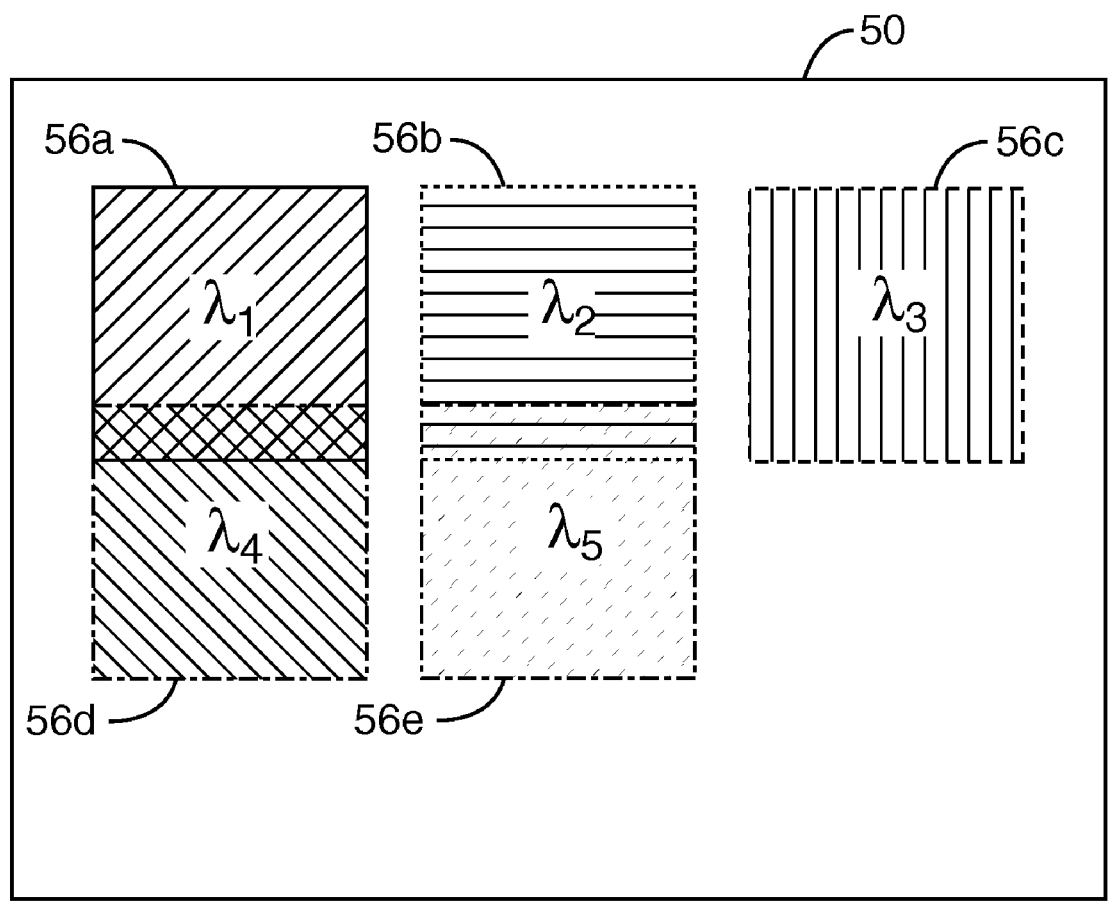
FIG. 3 shows a detector system for the optical spectrometer of FIG. 1 as illuminated according to one exemplary embodiment.

Exemplary dispersion systems 40 may disperse light along uniform, at least partially overlapping parallel rows of the detector array 52, as shown by the detector system 50 of FIG. 3. Alternatively, exemplary dispersion systems 40 may disperse light onto detector system 50 according to a less uniform dispersing pattern, such as the one illustrated by FIG. 4. Further, while FIG. 3 only shows a partial overlap in the second direction, it will be appreciated that in some embodiments, one or more images of the second set may fully overlap one or more images of the first set. While FIGS. 2A and 2B only illustrate two dispersive elements 42a, 42b, those skilled in the art will appreciate that additional dispersive elements may be used to increase the number of diffraction orders of the dispersion system 40, and therefore to fold additional spectral subsets along additional offset dispersion paths and onto detector system 50. Further, the dispersion systems 40 illustrated in FIGS. 2A and 2B are for illustrative purposes only. As such, the present invention is not limited to the illustrated dispersion systems 40. Optical spectrometer 10 may use any dispersion system 40 that disperses the light in a wavelength dependent fashion such that at least one spatial filter image associated with one spectral subset is folded relative to another spatial filter image associated with a different spectral subset. Alternative dispersion systems 40 include volume holograms, Echelle gratings, multiple order thin gratings, grating/mirror combinations, etc.

Figure 4:
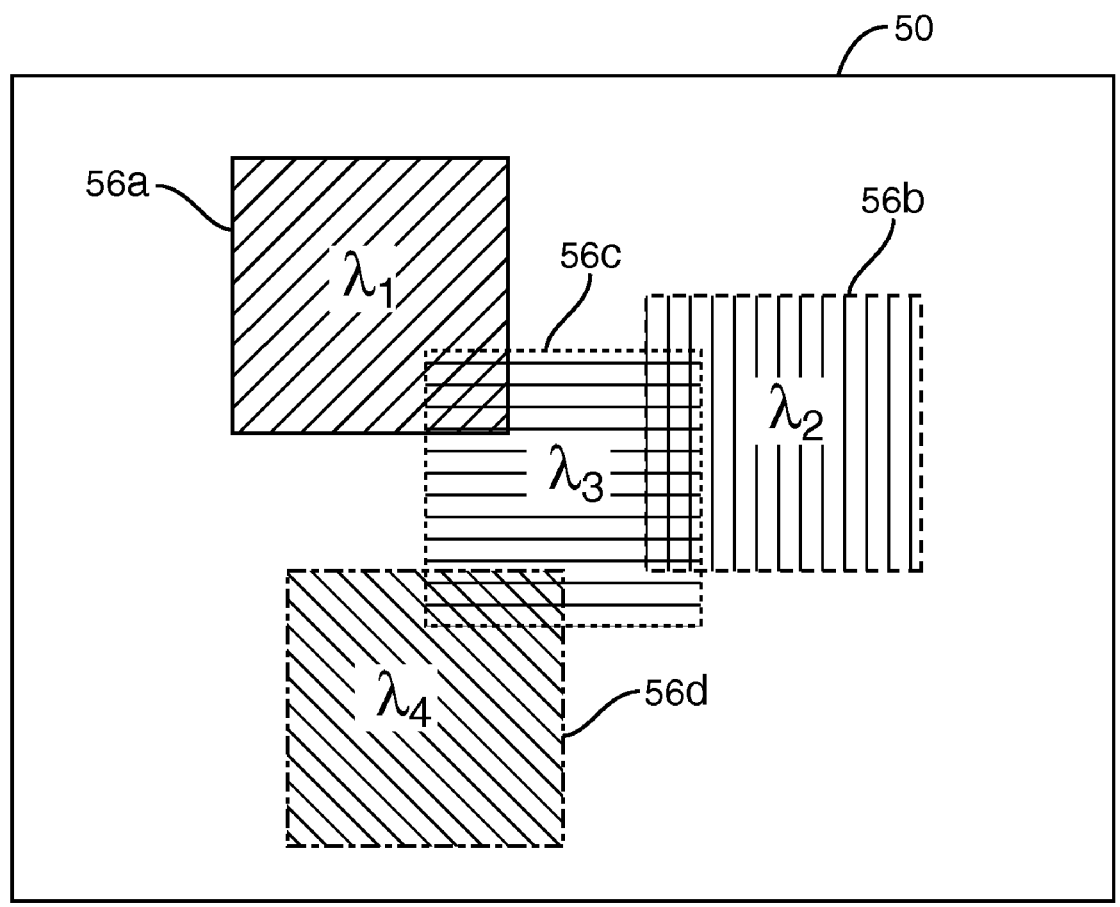
FIG. 4 shows a detector system for the optical spectrometer of FIG. 1 as illuminated according to another exemplary embodiment.

As shown in FIG. 3 and FIG. 4, the dispersion system 40 of the present invention causes spatial filter images 56a-e (generically 56) associated with different spectral subsets to overlap at the detector system 50. For example, one or more images 56 associated with different spectral subsets may at least partially overlap along the vertical length of detector system 50. Further, some or all of the spatial filter images 56 within a spectral subset may overlap. For example, one or more images 56 associated with a chromatic range of wavelengths in a spectral subset may at least partially overlap along a non-vertical direction, such as the direction projected along the horizontal length of detector system 50. To illustrate, consider the following example provided with reference to FIG. 4. Assume detector system 50 detects first, second, and third images 56a, 56b, 56c associated with $\lambda_1$, $\lambda_2$, and $\lambda_3$, respectively, where $\lambda_2$ is chromatically arranged between $\lambda_1$ and $\lambda_3$. When dispersion system 40 disperses the third image 56c to an area of the detector system 50 below the first image 56a, the third image 56c may vertically overlap the first image 56a even when the second image 56b does not overlap the first image 56a. It will further be appreciated that images associated with different wavelengths and/or different spectral subsets may vertically and horizontally overlap. As such, the images associated with both adjacent and non-adjacent wavelengths in the combined spectral range may overlap in multiple dimensions.

When images 56 overlap at detector system 50, the signals output by some detector elements in the detector array 52 include signals associated with multiple wavelengths. The detector system 50 described herein addresses the problems associated with overlapping images by resolving signals corresponding to the overlapping images. The following describes various embodiments of exemplary detector systems 50 that achieve this goal. In a first embodiment, detector system 50 electronically distinguishes the overlapping images in processor 54 using a selected analysis function that complements a coded aperture function associated with a coded aperture spatial filer. In a second embodiment, the detector system optically distinguishes the overlapping images using filters (e.g. optical filters, absorption length detectors), and then applies mathematical analysis to further distinguish the detector output signals associated with overlapping images. The following describes the details of each embodiment.

In the first embodiment, detector system 50 uses a selected analysis function to distinguish signals associated with overlapping images. For this embodiment, spatial filter 30 is a coded aperture 30 that spatially filters the incident light 7 according to a selected coded aperture function, and dispersion system 40 disperses images of the coded aperture in two partially overlapping dimensions onto detector system 50. Coded aperture 30 comprises a pattern of transmissive sections 32 and opaque sections defined by the coded aperture function. Processor 54 processes the detector output signals using an analysis function that complements the coded aperture function. By selecting an appropriate coded aperture function, and by convolving the detector output signals with a complementary analysis function, detector system 50 distinguishes overlapping images associated with different wavelengths, as discussed further below.

For this embodiment, optical spectrometer 10 requires a coded aperture 30 that creates a coded aperture image 56 at detector array 52 that maintains linearly independent spatial patterns when shifted. As a result of this linear independence, convolving a complementary analysis function with the coded aperture image associated with one wavelength produces a different result than convolving the same complementary analysis function with the coded aperture image associated with a different wavelength. This feature enables processor 54 to distinguish vertically and/or horizontally overlapping images 56. As a result, based on the results of the complementary analysis function convolution process, processor 54 recovers multiple spectral values. Further, based on the location of the coded aperture image on detector array 52, processor 54 determines the wavelengths associated with each recovered spectral value. Processor 54 then uses these wavelength-specific spectral values to generate the optical spectrum associated with the incident light 7.

Mathematically, a two-dimensional coded aperture function t(x, y) and the complementary analysis function $\hat{t}(x', y')$ that satisfies the above requirement satisfies:

$$\iint t(x, y) \cdot \hat{t}(x', y') dx dy \approx \delta(x-x')\delta(y-y'). \qquad (1)$$

Figure 5:
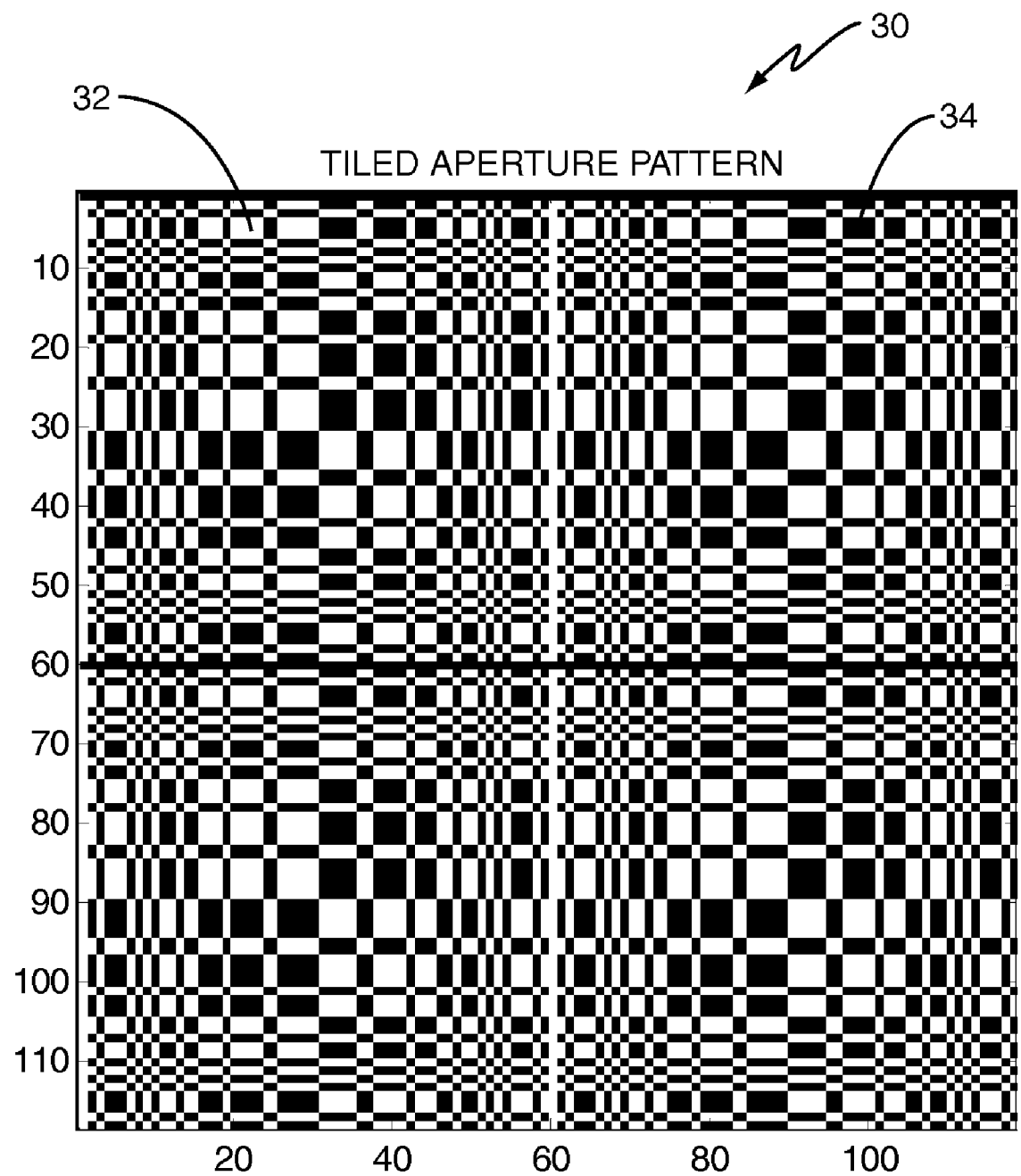
FIG. 5 shows one exemplary coded aperture for the optical spectrometer of FIG. 1.

Exemplary coded aperture functions and the associated complementary analysis functions that satisfy the above requirements include functions defined by Golay, Unified Redundant Arrays (URA), Modified URA (MURA), orthogonal/independent column codes, and/or any combination thereof. FIG. 5 illustrates an exemplary MURA pattern of order fifty nine tiled to enable full aperture coverage. This MURA pattern and the complementary function described by Gottesman and Fenimore represent an example of a suitable combination of coded aperture and complementary analysis functions (Gottesman, S. R., Fenimore, E. E., "New Family of Binary Arrays For Coded Aperture Imaging," *Applied Optics*, 1989, vol. 28, 4344, which is incorporated herein by reference). The following provides a brief mathematical explanation of the coded aperture function and the complementary analysis function as used by the optical spectrometer 10, followed by a couple of examples of coded apertures 30 applicable to the present invention.

Equation (2) defines the field distribution g(x, y) of spatial filter image at the detector array 52 as a function of the x and y coordinates of the detector array 52.

$$g(x, y) = \sum_n \int f(\lambda) t\left(\frac{(x-x_o)}{M} - \alpha_n \lambda, \frac{(y-y_o)}{M} - \gamma_n \lambda\right) d\lambda \qquad (2)$$

where:

$f(\lambda)$ = spectral density of the source radiation;

$t(x, y)$ = aperture function;

$M$ = magnification of the imaging lens systems;

$n$ = diffraction order;

$\alpha_n$ = horizontal dispersion rate for the $n^{th}$ diffraction order;

$\gamma_n$ = vertical dispersion rate for the $n^{th}$ diffraction order;

and $\lambda$ = wavelength.

Equation (2) further illustrates that the output field distribution g(x, y) consists of overlapping images of the coded aperture. The image of the coded aperture centered on a given point in the output is proportional to the spectral density of the source radiation at a corresponding wavelength. When the aperture is a pinhole, the aperture function may be represented by $t(x, y) = \delta(x, y)$. The resulting field distribution of the pinhole image at the detector is approximated by:

$$g(x, y) = \sum_n f\left(\frac{x - x_o}{M\alpha_n}\right) \delta\left(\frac{y - y_o}{M\gamma_n} - \frac{(x - x_o)}{M\alpha_n}\right). \tag{3}$$

When the aperture function is a coded aperture function having a complementary analysis function that satisfies Equation (1), the field distribution of the image after convolving with the analysis function may be represented by:

$$\hat{g}(x', y') = \int\int \hat{t}(x', y') g(x, y) dx dy \tag{4}$$

$$= \sum_n f\left(\frac{x' - x_o}{M\alpha_n}\right) \delta\left(\frac{y' - y_o}{M\gamma_n} - \frac{x' - x_o}{M\alpha_n}\right).$$

The processor 54 may use any conventional means to further process $\hat{g}(x', y')$ to estimate one or more properties of the incident light 7 radiated by the source 5.

Equation (4) reveals that processing the field distribution of the coded aperture image 56 with the complementary analysis function yields the same spectrum as obtained from a pinhole image with the same feature size. As such, Equation (4) illustrates how a coded aperture 30 may be used to obtain pinhole resolution, even when images 56 of the coded aperture overlap at detector array 52.

One exemplary coded aperture 30 applicable to the present invention comprises a coded slit aperture defined by a one-dimensional coded aperture function $t(y)$. The coded slit aperture consists of a vertical series of pinholes modulated by predetermined weighting factors. Typically, the weighting factors are either one for an open pinhole or zero for a closed pinhole. For this embodiment, Equation (1) simplifies to:

$$\int t(y) \hat{t}(y') dy = \delta(y - y') \tag{5}$$

Equation (6) defines one exemplary coded aperture function that satisfies the relationship defined by Equation (5), as derived by Golay, M. J. E., "Multislit Spectroscopy," *J. Opt. Soc. Amer.*, 1949, vol. 39, pp. 437-444; Golay, M. J. E., "Complementary Series," *IRE Trans. Inform. Theory*, April 1961, vol. IT-7, pp. 82-87, both of which are incorporated herein by reference.

$$t(x, y) = \beta^0\left(\frac{x}{\Delta}\right) \sum_i t_i \beta^0\left(\frac{y - i\Delta}{\Delta}\right) \tag{6}$$

where:

$\beta^0(x)$ = zero$^{th}$ order $B$-spline (rectangular function of width 1);

$\Delta$ = width of the aperture slit; and $t_i$ = weighting factor of $i^{th}$ pinhole along the coded aperture split.

Substituting Equation (6) into Equation (2) produces:

$$g(x, y) = \sum_{n,i} \int t_i f(\lambda) \beta^0 \tag{7}$$

$$\left(\frac{x - x_o}{\Delta M} - \alpha_n \frac{\lambda}{\Delta}\right) \beta^0$$

$$\left(\frac{y - y_o}{\Delta M} - i - \gamma_n \frac{\lambda}{\Delta}\right) d\lambda,$$

which represents the field distribution of the coded slit aperture image at the detector array 52. Integrating the field distribution of the coded slit aperture image over each pixel of the detector array 52 transforms the continuous field distribution into discrete field distribution measurements $g_{km}$ for each (k, m) detector. Assuming that each pixel of the detector array 52 is rectangular and has a width defined by $M\Delta$, the discrete field distribution measurements may be represented by:

$$g_{km} = \int\int g(x, y) \beta^0\left(\frac{x}{M\Delta} - k\right) \beta^0\left(\frac{y}{M\Delta} - m\right) dx dy \tag{8}$$

$$= \sum_{n,i} t_i f_{(m-i)nk'}$$

where $$f_{(m-i)nk} = \int f(\lambda) \beta^1\left(k - \frac{x_o}{M\Delta} - \alpha_n \frac{\lambda}{\Delta}\right) \beta^1$$

$$\left(m - i - \frac{y_o}{M\Delta} - \gamma_n \frac{\lambda}{\Delta}\right) d\lambda,$$

and where $\beta^1\left(\frac{y}{\Delta}\right)$ is the first order $B$-spline.

The weighting factors $t_i$ may be defined by a de-convolvable series, such as a Golay complementary series. Processing the discrete field distribution measurements $g_{km}$ with the discrete complementary analysis series $\hat{t}_i$, where $$\sum_i t_i \hat{t}_m = \delta_{m-i,0},$$

produces a processed discrete field distribution, also referred to herein as the reconstructed spectrum:

$$\hat{g}_{kp} = \sum_m \hat{t}_{m-p} g_{km} = \sum_n f_{pnk} \tag{9}$$

When the diffraction orders of the dispersed light are spaced such that $\alpha_n \approx \alpha_0 + n\delta\alpha$ and $\gamma_n = n\delta\gamma$, $f_{pnk}$ is non-vanishing for $$n \approx \frac{\Delta}{\lambda \delta \gamma}\left(p - \frac{y_o}{M\Delta}\right).$$

For this scenario, the processed discrete field distribution becomes:

$$\hat{g}_{kp} = \sum_n f_{pnk} \quad (10)$$

$$\approx f\left(\frac{k\Delta - \frac{x_o}{M}}{\alpha_o + \frac{\Delta\delta\alpha}{\delta\gamma}\left(p - \frac{y_o}{M\Delta}\right)}\right)$$

$$\approx f\left(k\frac{\Delta}{\alpha_o} - p\frac{\Delta\delta\alpha}{\alpha_o\delta\gamma} - \lambda_o\right),$$

where $\lambda_o$ = the first wavelength channel in the central diffraction order($k = p = 0$); and $$\alpha_o \gg \left|\frac{\Delta\delta\alpha}{\delta\gamma}\left(p - \frac{y_o}{M\Delta}\right)\right|.$$

Equation (10) illustrates that the processed discrete field distribution $\hat{g}_{kp}$ is proportional to the spectral density of the source radiation $f(\lambda)$ evaluated at $$\lambda = k\frac{\Delta}{\alpha_o} - p\frac{\Delta\delta\alpha}{\alpha_o\delta\gamma} - \lambda_o.$$

Incrementing k shifts the evaluation wavelength in steps of $\lambda/\lambda_o$, while incrementing p shifts to a new spectral subset on a different horizontal row of detector array 52. It will be appreciated that the spectral subsets are independent if $$L\frac{\delta\gamma}{\delta\alpha} \leq 1,$$

where L is the number of wavelength steps in a spectral subset. As such, by appropriately selecting L, the optical spectrometer 10 may use the coded slit aperture 30 and its complementary analysis function to process overlapping images at the detector. The independence of the input slit code $t_i$ and the complementary series $\hat{t}_i$ enables Equation (9) to deconvolve the spectral density of the source radiation $f(\lambda)$ and the input slit code. This produces the reconstructed spectrum defined by Equation (10).

The above mathematically describes the results obtained when the spectrometer 10 includes a coded slit aperture 30 defined by a Golay series, and when the processor 54 uses a complementary Golay series to process the field distribution of the coded slit aperture image 56 at the detector array. The following provides examples of additional code aperture functions that may be advantageously employed by the optical spectrometer 10.

In one exemplary embodiment, the coded aperture 30 may comprise a two dimensional coded aperture, where the coded aperture function and the complementary analysis function comprise complementary coding patterns, such as the patterns defined by the uniformly redundant arrays (URA) used in imaging systems. Such two dimensional apertures increase signal throughput over slit apertures by allowing more incident light 7 to pass through the system 10.

In this embodiment, the coded aperture function may be represented by:

$$t(x, y) = \sum_{i,j} t_{ij}\beta^0\left(\frac{x - i\Delta}{\Delta}\right)\beta^0\left(\frac{y - j\Delta}{\Delta}\right), \quad (11)$$

where $t_{ij}$ = weighting factor for the ($i^{th}$, $j^{th}$) pinhole in the 2D coded aperture.

The resulting discrete field distribution may be represented by:

$$g_{km} = \sum_{n,m-i,k-j} t_{i,j} f_{(m-i)n(k-j)}, \quad (12)$$

where $f_{(m-i)n(k-j)} =$ $$\int f(\lambda)\beta^1\left((m-i) - \frac{x_o}{M\Delta} - \alpha_n\frac{\lambda}{\Delta}\right)\beta^1\left((k-j) - \frac{y_o}{M\Delta} - \gamma_n\frac{\lambda}{\Delta}\right)d\lambda.$$

When the weighting factors $t_{ij}$ are defined according to the modified URA (MURA) patterns described in Gottesman and Fenimore, the processed discrete field distribution derived from Equations (9) and (12) may be represented by:

$$\hat{g}_{pq} = \sum_{km} \hat{t}_{k-p,m-q} g_{km} = \sum_n f_{pnq} \approx f\left(p\frac{\Delta}{\alpha_o} - q\frac{\Delta\delta\alpha}{\alpha_o\delta\gamma} - \lambda_o\right). \quad (13)$$

This processed discrete field distribution is similar to that shown in Equation (10). As such, the MURA solution generates a processed discrete field distribution similar to the one generated by the coded slit aperture.

The above two-dimensional MURA coded aperture packs spectral channels at a density of one channel per pixel. However, the present invention is not limited to this distribution. Exemplary embodiments may combine MURA patterns with orthogonal code patterns to pack the spectral channels at a density of several vertical channels per pixel, particularly if the dispersion system limits the number of diffraction orders to between three to ten orders. Orthogonal code patterns are discussed in detail in commonly owned U.S. patent application Ser. No. 11/334,546 to Brady, which is incorporated herein by reference. One harmonic code described by Brady, $$t_o(x, y) = \frac{1}{2}(1 + \cos(\alpha xy)),$$

represents one exemplary orthogonal code.

Equation (14) represents an exemplary coded aperture function for this embodiment.

$$t(x, y) = \sum_k rect\left(\frac{y - k\Delta_y}{\Delta_y}\right) rect\left(\frac{x}{\Delta_x}\right) t_o(x - k\Delta_x, y - k\Delta_y), \quad (14)$$

where $t_o(x, y)$ = an orthogonal code pattern having independent

-continued column codes; $\Delta_y$ = height of the 2D coded aperture; and $\Delta_x$ = width of the 2D coded aperture.

Figure 6:
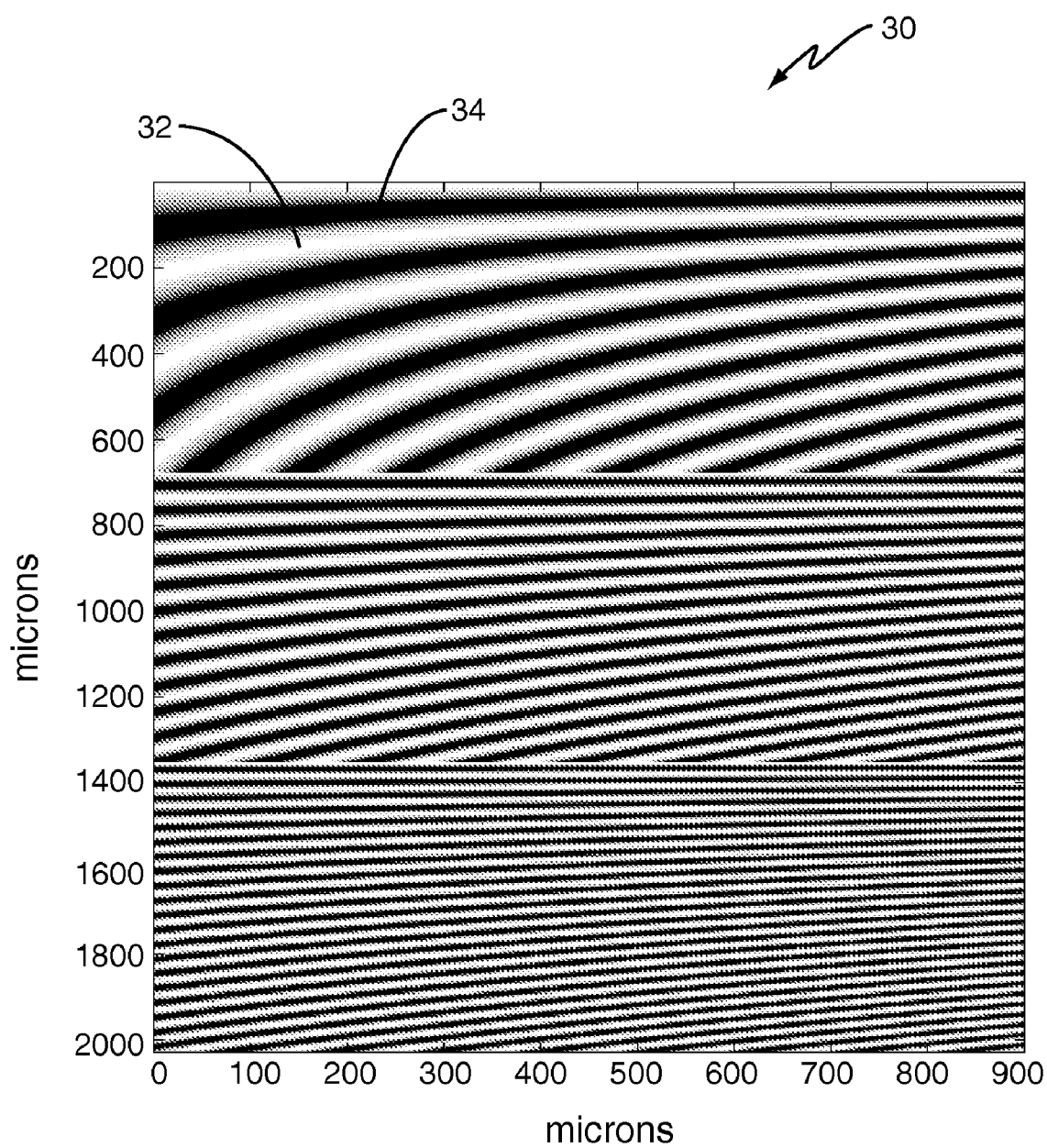
FIG. 6 shows another exemplary coded aperture.

As shown by FIG. 6, the coded aperture 30 resulting from the function of Equation (14) is a rastered version of an independent column code.

For this embodiment, Equation (1) simplifies to:

$$\int t(x, y) \cdot t(x', y') dy \approx \delta(x-x'). \quad (15)$$

Equation (16) represents one exemplary complementary analysis function that satisfies Equation (15).

$$\hat{t}(x', y') = \sum_k rect\left(\frac{y' - k\Delta_y}{\Delta_y}\right) rect\left(\frac{x'}{\Delta_x}\right) t_o(x' - k\Delta_x, y' - k\Delta_y) \quad (16)$$

By selecting $\Delta_y = \bar{\lambda}\delta\gamma/M$, where $\bar{\lambda}$ is the mean wavelength in the spectral subset, processor 54 may apply orthogonal analysis to the dispersed light projected onto detector array 52 under the assumption of modest fractional bandwidth. Algebraic correction may be used when the fractional bandwidth is larger. Like with the URA-based coded aperture, the processed images produce field distribution similar to that of Equation (10).

Coded apertures 30 for the above-described optical spectrometer 10, including the above-discussed examples, may be implemented by any known technique. For example, the coded aperture 30 may be implemented by a static transmission mask, as shown by the MURA coded aperture in FIG. 5. Alternatively, the coded aperture 30 may be implemented by a spatial light modulator. In still another embodiment, the coded aperture 30 may be implemented by a fiber bundle disposed between the source and the coded aperture position, as described in the U.S. patent application Ser. No. 11/421,903, entitled "Structured Coded Aperture Fiber Bundles" and filed Jun. 2, 2006, which is incorporated herein by reference. According to this embodiment, the fibers in the fiber bundle are arranged such that each fiber corresponds to a transmissive element. Fiber coupling the light radiated from the source allows spatially dense sampling of the source radiation. Further, this embodiment may allow removal of the collection lens 22, which may allow for a more compact implementation of the optical system 20.

As mentioned above, processor 54 applies the complementary analysis function to images 56 associated with different wavelengths and detected by detector array 52. Generally, processor 54 convolves the analysis function with the distribution field of the coded aperture image detected by detector array 52. In so doing, processor 54 removes ambiguities associated with overlapping images while simultaneously taking advantage of the high optical throughput and spectral resolution provided by coded aperture 30. Subsequently, processor 54 may further process the resulting signal to estimate one or more wavelength-dependent properties of the incident light 7 associated with source 5.

Figure 7:
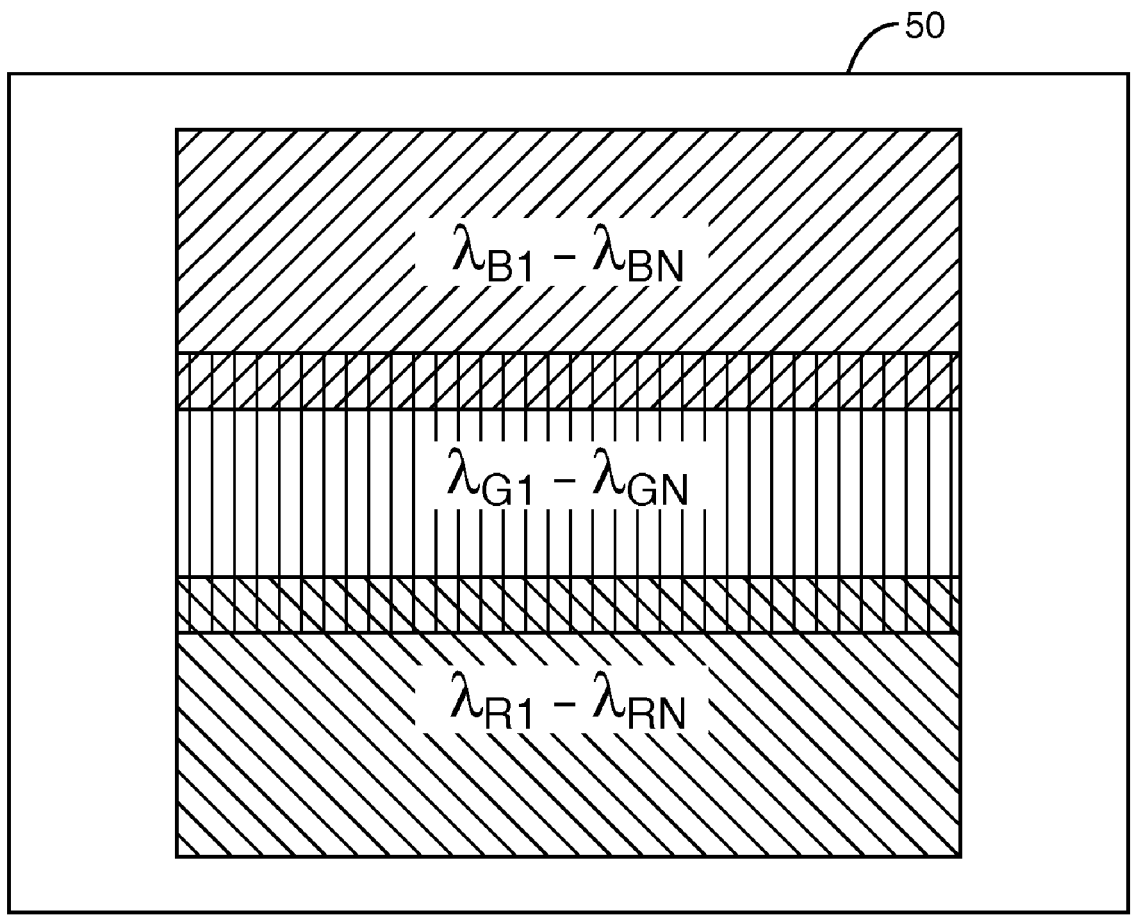
FIG. 7 shows a detector system for the optical spectrometer of FIG. 1 as illuminated according to one exemplary embodiment.

In a second embodiment, dispersion system 40 disperses spatial filter images associated with different spectral subsets onto overlapping portions of detector system 50. FIG. 7 shows a front view of an exemplary detector system 50 illuminated with spatial filter images from three different spectral subsets. To distinguish overlapping images from different spectral subsets, detector system 50 filters the spatial filter images to optically distinguish the spatial filter images in one spectral subset from the spatial filter images in another spectral subset. For this embodiment, spatial filter 30 may comprise any known spatial filter, including a pinhole, slit, coded aperture, etc.

Figure 8:
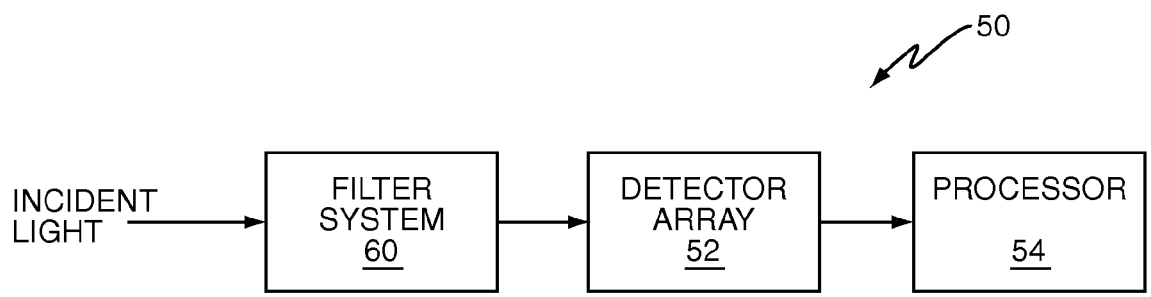
FIG. 8 shows a block diagram for an exemplary detector system for the optical spectrometer.

FIG. 8 shows a block diagram of an exemplary detector system 50 for this embodiment, where the detector system 50 includes a filter system 60 of two or more filters disposed proximate detector array 52. Each filter in filter system 60 optically filters the dispersed light to optically distinguish the spatial filter images in one spectral subset from the spatial filter images in a different spectral subset. Processor 54 individually processes the resulting detector output signals corresponding to the different spectral subsets to generate the spectrum associated with each spectral subset, and generates a combined spectrum based on the generated individual spectrums, as discussed further below.

Figure 9:
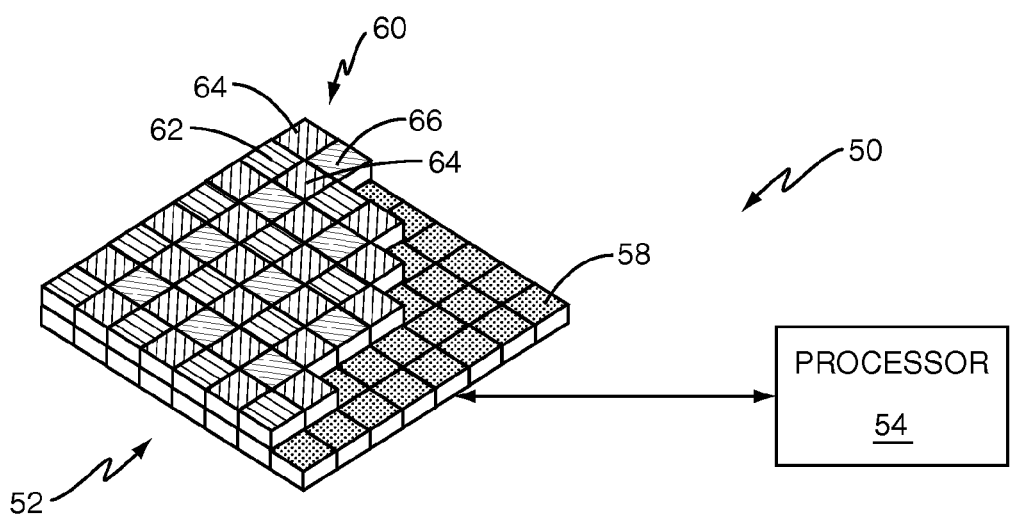
FIG. 9 shows one exemplary detector system for the optical spectrometer of FIG. 1.

In one exemplary detector system 50, filter system 60 is integrated with detector array 52. FIG. 9 shows one exemplary detector array 52 that includes a filter system 60 integrated with the input side of an array of detector elements 58. In the illustrated embodiment, filter system 60 comprises three different filter elements 62, 64, 66 arranged in a predetermined pattern, where each filter element 62, 64, 66 is aligned with a different detector element 58. The combination of each of the filter elements 62 collectively represents a first filter, the combination of each of the filter elements 64 collectively represents a second filter, and the combination of each of the filter elements 66 collectively represents a third filter. When arranged in the predetermined pattern, the first, second, and third filters interleave to form filter system 60. For a detector array 52 with N detector elements 58, up to N/4 output signals correspond to each of the spectral subsets of filters 62 and 66, and up to N/2 output signals correspond to the spectral subset of filter 64.

Figure 10:
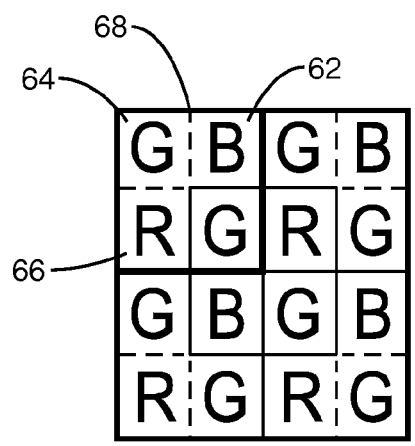
FIG. 10 shows one exemplary filter pattern for the detector array of FIG. 9.

For illustrative purposes, one exemplary pattern comprises the Bayer pattern shown in FIG. 10. For this example, filter 62 passes blue light (410-520 nm), filter 64 passes green light (490-620 nm), and filter 66 passes red light (590-745 nm). The Bayer pattern divides detector array 52 into blocks 68 of detector elements, where each block 68 includes four detector elements 58, where one detector element 58 is integrated with a blue filter 62, two detector elements 58 are integrated with a green filter 64, and one detector element 58 is integrated with a red filter 66. Each block 68 outputs signals associated with three different spectral subsets. As a result, each block 68 at least partially distinguishes overlapping images from different spectral subsets. It will be appreciated that the present invention is not limited to the RGB filter system 60 described with reference to FIGS. 9 and 10.

To illustrate the operation of the detector system 50 of FIG. 9, consider the following example. Assume spatial filter images associated with a blue spectral subset, a green spectral subset, and a red spectral subset overlap at detector system 50, as shown in FIG. 7. However, each block 68 outputs a different signal for each spectral subset. This ability to output subset-specific signals for each overlapping image enables detector system 50 to distinguish spatial filter images associated with different spectral subsets. While FIG. 7 only illustrates a partial overlap between different spectral subsets, it will be appreciated that the integrated filter embodiment works even when the images from different spectral subsets fully overlap.

Figure 11:
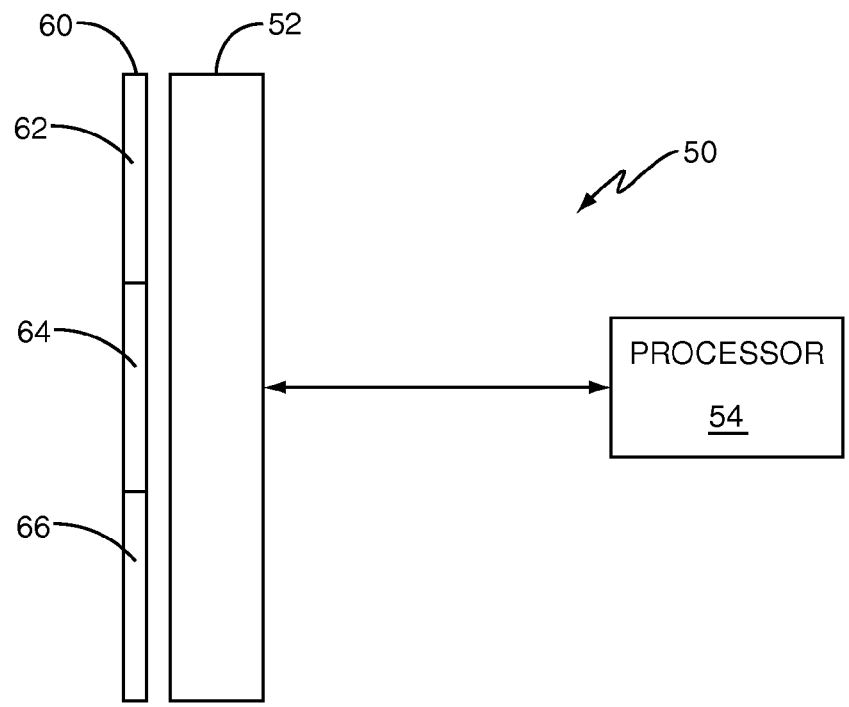
FIG. 11 shows another exemplary detector system for the optical spectrometer of FIG. 1.

FIG. 11 shows another exemplary detector system for the second embodiment, where filter system 60 is disposed in front of or upstream of detector array 52. For this embodiment, filter system 60 comprises a continuous filter element 62, 64, 66 for each spectral subset, where each filter element 62, 64, 66 aligns with the specific region of detector array 52 associated with a corresponding spectral subset. As a result, each filter 62, 64, 66 of filter system 60 divides detector array 52 three different sections, where each section corresponds to a different spectral subset. Using the above-discussed RGB filer bands, a top filter element 62 passes only blue light in the blue spectral subset to the top portion of the detector array 52, while a middle filter element 64 and a bottom filter element 66 pass only green and red light in the green and red spectral subsets to a middle and bottom portion of the detector array 52, respectively.

Figure 12:
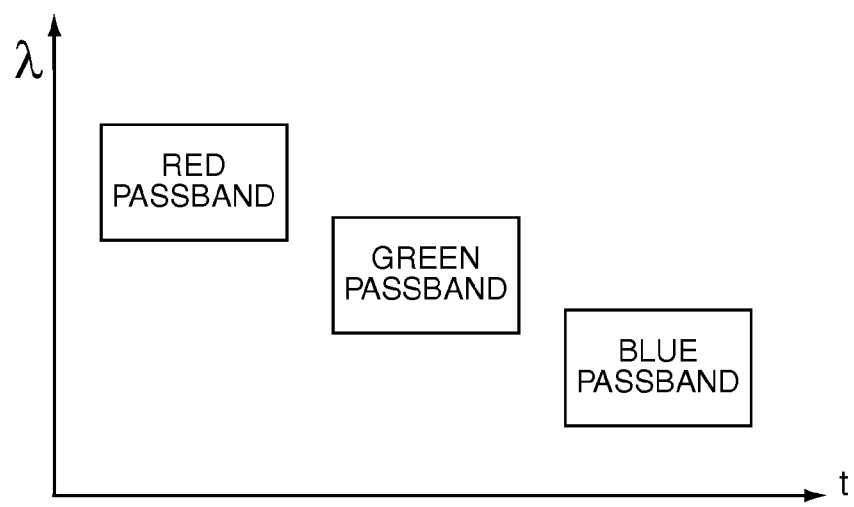
FIG. 12 plots the wavelength response with respect to time for a time-varying filter.

In another detector system 50 for the second embodiment, filter system 60 may comprise a time varying filter. Accordingly, filter system 60 optically filters the dispersed light according to a first passband during a first time period, and optically filter the dispersed light according to second and third passbands during second and third time periods, respectively. FIG. 12 illustrates the filtering properties of an exemplary time-varying filter system 60 having red, green, and blue passbands. As with the integrated filter embodiment, the time varying filter embodiment distinguishes images from different spectral subsets that fully overlap.

In still another detector system 50 for the second embodiment, each detector element 58 in detector array 52 may be designed to output different electrical signals for two or more spectral subsets based on the absorption length of the light in the detector element 58. For example, the absorption lengths for red, green, and blue light are different for a silicon detector element, where the absorption length for red light is longer than for green light, and where the absorption length for green light is longer than for blue light. When each detector element 58 is designed to take advantage of this property, each detector element outputs an electrical signal for each spectral subset, e.g., the red, green, and blue spectral subsets. U.S. Pat. No. 5,965,875, incorporated herein by reference, describes one such detector array 52. As with the earlier-discussed integrated filter embodiment, the absorption length detector system distinguishes images from different spectral subsets that fully overlap.

Figure 13:
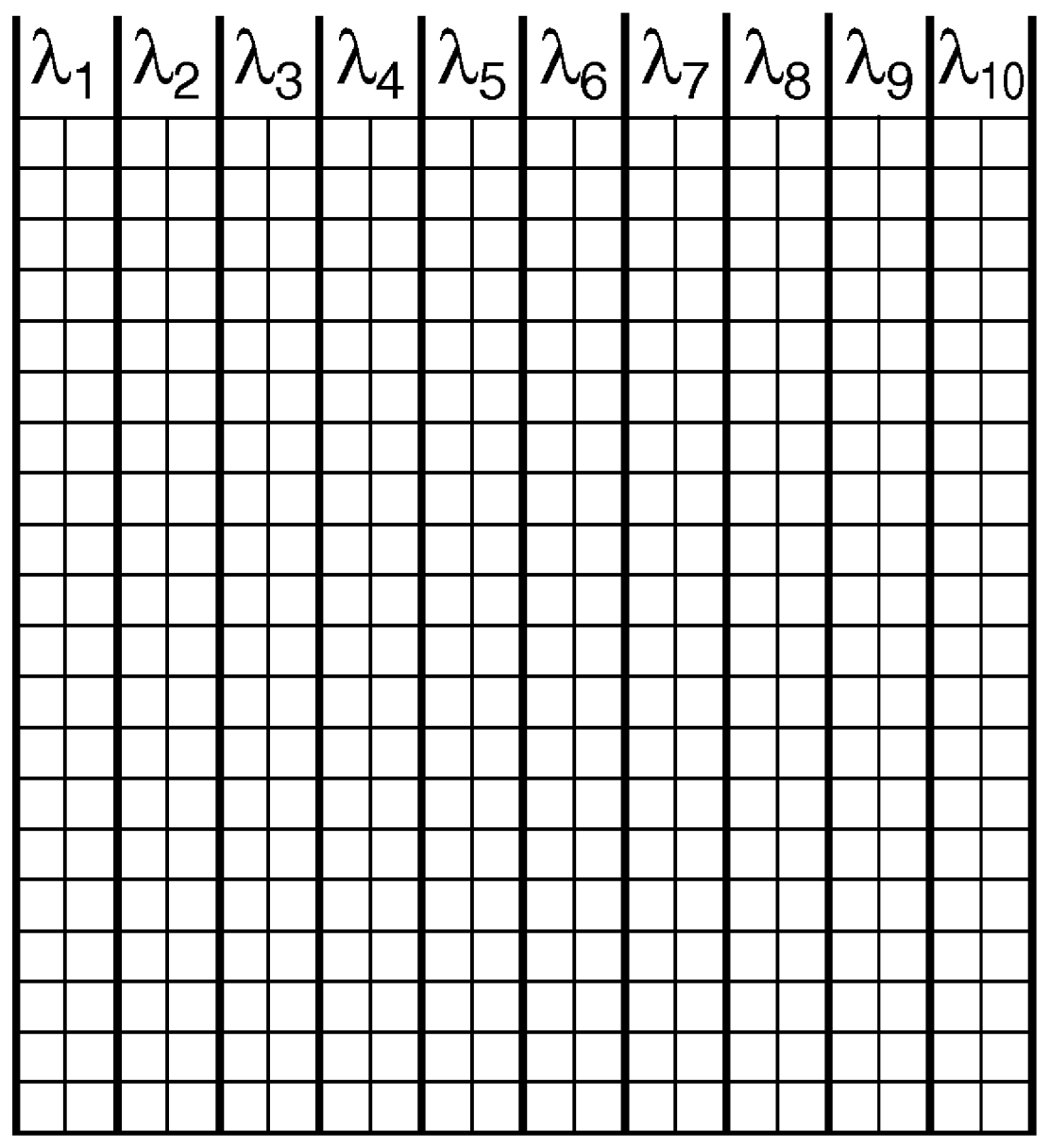

In any of the above-described detector systems 50 for the second embodiment, each detector output signal corresponds to a particular spectral subset. As such, the filters distinguish vertically overlapping images. To distinguish images associated with different wavelengths within a spectral subset, processor 54 uses the location of the image(s) on the detector array 52. As discussed above, each spectral subset includes a range of wavelengths, such as $\lambda_1$-$\lambda_n$, where n represents the number of wavelengths in a given spectral subset. To distinguish the wavelengths within a spectral subset, one embodiment divides the detector array 52 into n columns, where each of the n columns corresponds to a different wavelength in a given spectral subset. FIG. 13 shows an exemplary detector array 52 divided into ten columns, where each column is two detector elements wide. For this example, each spectral subset is divided into ten wavelengths, where the position of the dispersed light on detector array 52 determines the wavelength within the spectral range of the detected light. Therefore, for this example, images detected by detector elements 58 in the first two columns of detector array 52 correspond to $\lambda_1$ in any of the available spectral subsets.

Based on the signal output by each detector element 58 and on the relationship between the detector output signal and the detector's location within the detector array 52, processor 54 generates an output spectrum for each spectral subset. The following details one exemplary procedure for generating the individual spectrums for each spectral subset. Light incident at detector system 50 may be represented by:

$$I(x', y') = \iiint \delta(x-(x'+\alpha(\lambda-\lambda_c)))\delta(y-y')T(x, y)S(x, y;\lambda) \, dxdyd\lambda, \quad (17)$$

where $\delta(x-(x'+\alpha(\lambda-\lambda_c)))$ represents the propagation kernel for a dispersive spectrometer with no internal magnification and with a linear dispersion of $\lambda$ along the x-axis and a center wavelength of $\lambda_c$ at x=0 for all y. In Equation (17), T(x, y) represents the transmittance function of a two-dimensional spatial filter 30, and S(x, y;$\lambda$) represents the spectral density of the source 5 as a function of position in the spatial filter 30. Assuming S(x, y;$\lambda$) is constant in x and y, Equation (17) may be reduced to:

$$I(x', y') = \int T(x', y')S\left(\lambda = \frac{x-x'}{\alpha} + \lambda_c\right)dx. \quad (18)$$

As shown by Equation (18), the intensity I(x', y') measured by detector array 52 is the result of a one-dimensional convolution between the source spectrum S(x, y;$\lambda$) and the spatial filter transmittance function T(x, y). When spatial filter 30 comprises a slit at x=$x_0$, T(x, y) may be approximated by a delta function centered at $x_0$ and Equation (18) may be reduced to:

$$I(x', y') = S\left(\lambda = \frac{x_0 - x'}{\alpha} + \lambda_c\right). \quad (19)$$

Alternatively, when spatial filter 30 comprises a two-dimensional coded aperture defined by a coded aperture function T(x, y), T(x, y) must be properly designed so that Equation (18) yields an accurate intensity estimate. The above-described coded aperture functions are applicable to this embodiment, and therefore, provide several appropriate options.

Applying the above mathematical process to each detector element output signal produces a matrix of intensity values M, where each intensity value corresponds to a different detector element 58. Mathematically, M may be represented as the product of H, the spatial filter function in matrix form, with W, a matrix of spectral values associated with source 5, as shown in Equation (20).

$$H \cdot W = M \quad (20)$$

Processor 54 may determine the matrix of spectral values W by applying any known matrix inversion process, such as a non-negative least squares inversion algorithm.

The resulting matrix of spectral values includes multiple spectral values for each wavelength in a particular spectral range. To generate a single spectral value for each wavelength, processor 54 may average each value in computed matrix W associated with a specific wavelength. For example, by averaging the values in one or more adjacent columns of W associated with $\lambda_1$, processor 54 estimates a wavelength-specific spectral value for $\lambda_1$. This process may be performed for each wavelength in a spectral subset. Based on the resulting wavelength-specific spectral estimates, processor 54 generates the spectrum for each spectral subset.

While not explicitly discussed above, it will be appreciated that processor 54 may further process the detector output signals to reduce noise, distortion, etc. For example, processor 54 may subtract a dark image from M before computing W to reduce pattern noise. Alternatively or in addition, before computing W, processor 54 may slightly shift each row of M by a predetermined amount to correct for distortion, such as "smile" distortion present in the spectrometer 10.

Once the individual spectrums are generated, processor 54 superimposes the individual spectrums to generate a combined spectrum corresponding to the incident light 7 radiated from source 5. When the passbands of filters 62, 64, 66 do not overlap, processor 54 may simply combine the individual spectrums for each spectral subset into a single combined spectrum. However, when the passbands of two or more filters 62, 64, 66 overlap, processor 54 first corrects for the overlap to reduce spurious spectral features before superimposing the individual spectrums. To illustrate, consider the above-discussed integrated filter system 60 with one blue filter 62, two green filters 64, and one red filter 66 arranged in the Bayer pattern. For this example, we define an effective column of detector elements 58 as a column of detector blocks 68. Equation (21) illustrates the relationship between the calculated spectral values and the spectral values attributable to the overlap.

$$R = rF_{red}(\lambda_r) + gF_{red}(\lambda_g) + bF_{red}(\lambda_b)$$

$$G = rF_{green}(\lambda_r) + gF_{green}(\lambda_g) + bF_{green}(\lambda_b)$$

$$B = rF_{blue}(\lambda_r) + gF_{blue}(\lambda_g) + bF_{blue}(\lambda_b) \quad (21)$$

Figure 14A:
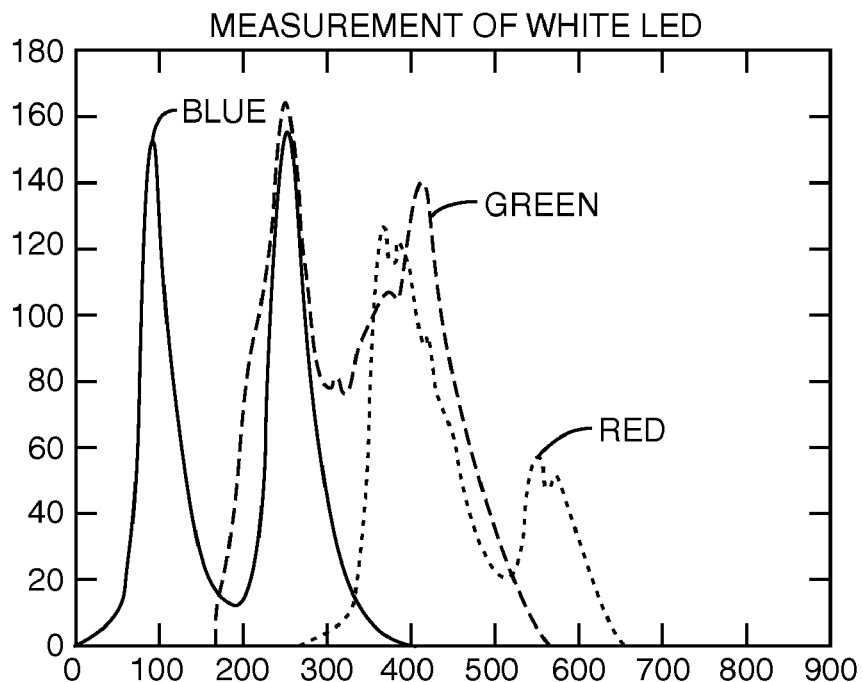
FIGS. 14A and 14B show exemplary spectrums generated by the processor.
Figure 14B:
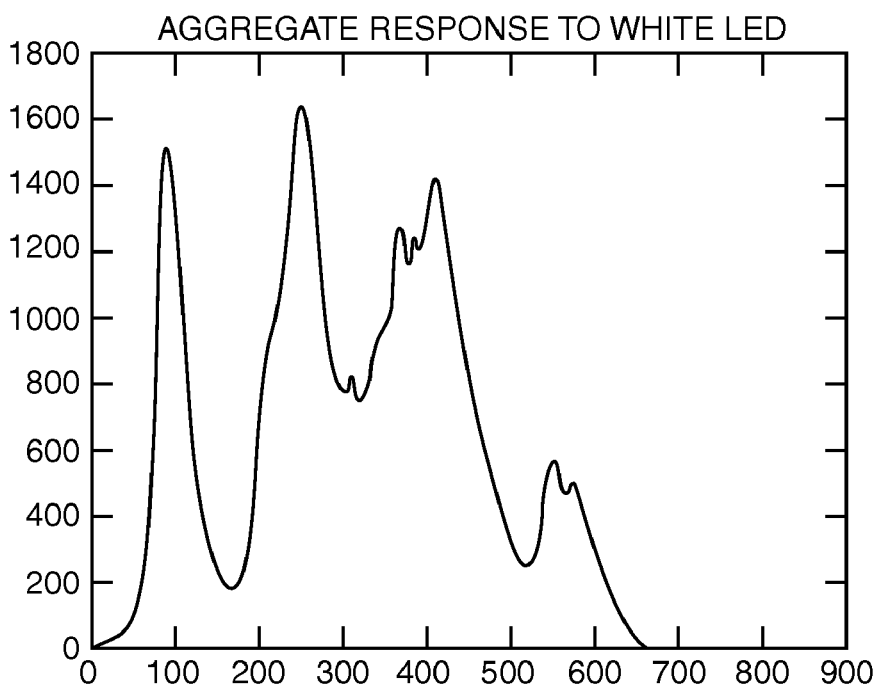

In Equation (21), (R, G, B) represent the calculated spectral values, (r, g, b) represent the overlap spectral values, and $F_{color}(\lambda)$ represents the value of the filter functions associated with filters 62, 64, 66 corresponding to a particular effective column of the detector. By using a non-negative least squares algorithm, processor 54 may recover the overlap spectral values (r, g, b) from the calculated spectral values (R, G, B). Based on these overlapping spectral values, processor 54 compensates for spectral overlap before superimposing the individual spectrums to generate the combined spectrum. FIG. 14A illustrates the three individual spectrums for the RGB detector system 50 of FIG. 9, while FIG. 14B illustrates the combined spectrum that result from the above-described processing techniques.

To summarize, by selecting an appropriate coded aperture function and complementary analysis function, and/or by using filters with appropriate processing techniques, as described above, detector system 50 removes the ambiguities associated with overlapping spatial filter images. This gives optical spectrometer 10 a significant processing advantage over conventional systems, which do not allow the images to vertically overlap at the detector system 50. While the above describes the coded aperture and filter embodiments as separate embodiments, it will be appreciated that another exemplary optical spectrometer 10 may use both a coded aperture and complementary analysis function with filters.

Figures 15A, 15B:
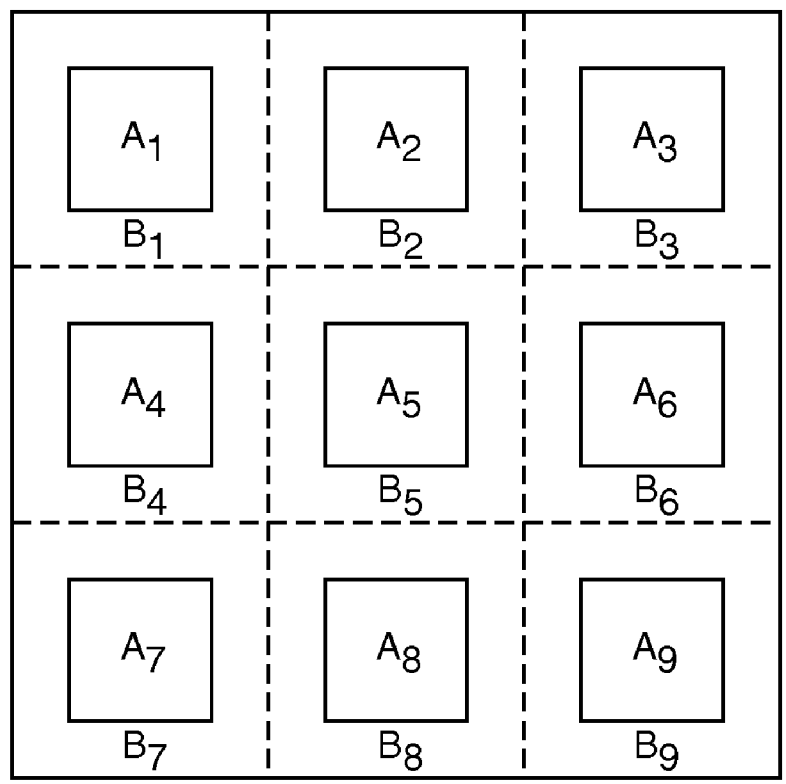
FIGS. 15A and 15B show a comparison between the size of a conventional detector array and an exemplary detector array of the present invention.

Further, because the spatial filter images are allowed to overlap, the overall size of the second imaging system 26 and/or the detector array 52 may be significantly reduced. For example, assume spectrometer 10 covers a spectral range of nine wavelengths, where dispersion system 40 positions spatial filter images associated with the different wavelengths in three vertically offset spectral subsets, and where each spectral subset includes three wavelengths. Further, assume that each spatial filter image has an area A. A conventional detector array, such as shown in FIG. 15A, requires a buffer area B around each spatial filter image to prevent any overlap. As such, the detector array of FIG. 15A must reserve a total area D=A+B for each spatial filter image. A conventional spectrometer bound by these requirements therefore requires a detector array that has a minimum operating area of 9D. Contrastingly, because some embodiments of the spectrometer 10 of the present invention allow overlapping images, the detector array 52 used in such an optical spectrometer 10 may have an operating area <9A, as shown in FIG. 15B. When using integrated filters, spatial filter images from different spectral ranges may fully overlap, enabling the detector area to be reduced even further to <3A. As such, the size of the optical spectrometer 10 described herein may be reduced relative to conventional spectrometers.

In the above examples, optical system 20 is distortion-free, and therefore, generates equal-sized spatial filter images at detector system 50 for all wavelengths. However, it will be appreciated that the present invention does not require equal-sized spatial filter images. Some embodiments of spectrometer 10 accommodate different-sized spatial filter images, such as those deformed by distortion or those intentionally formed by wavelength-dependent filters. For example, if the spatial filter 30 includes wavelength-dependent regions, i.e., those formed by wavelength-dependent filters, the resulting spatial filter images at the detector system 50 may intentionally have different wavelength-dependent sizes.

The above also describes the coded aperture 30 in terms of transparent sections 32 and opaque sections 34. However, a coded aperture 30 according to the present invention generally includes multiple sections that filter the light according to different weighting values. Typically, the weighting values range between 0 and 1, where an opaque section 34 has a 0 weighting value and a transparent section 32 has a 1 weighting value. Thus, a given section may have any weighting value between 0 and 1, resulting in what might be referred to as a gray-scaled coded aperture 30.

The spectral subsets are described above in terms of non-overlapping spectral subsets of a combined spectral range. However, it will be appreciated that different spectral subsets may include one or more common wavelengths. For example, the first spectral subset may include $\lambda_1$-$\lambda_{10}$, while the second spectral subset may include $\lambda_8$-$\lambda_{17}$.

The discussion above assumed that processor 54 processes all detector output signals associated with all spatial filter images. However, processor 54 may also selectively process a subset of the spatial filter images detected by the detector system 50. For example, if detector system 50 detects spatial filter images for $\lambda_1$, $\lambda_5$, and $\lambda_8$, processor 54 may selectively process only the spatial filter image associated with $\lambda_5$ or only the spatial filter images associated with $\lambda_5$ and $\lambda_8$. Further, processor 54 may only process a subset of detector output signals associated with any one spatial filter image.

The above-described processor 54 may be implemented in a single microprocessor or in multiple microprocessors. Suitable microprocessors may include, for example, both general purpose and special purpose microprocessors and digital signal processors. Further, the operations executed by the processor 54 may be embodied in hardware and/or in software, including firmware, resident software, micro-code, etc. Further, the logic circuits of the processor 54 may be integrated with the optical spectrometer 10, placed in an external computer linked to the optical spectrometer 10, or any combination thereof.

The above-mentioned U.S. Pat. No. 5,559,597 to Battey et al., is hereby incorporated by reference.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An optical spectrometer comprising:
   a spatial filter configured to spatially filter incident light;
   a detector system comprising a two-dimensional detector array operatively connected to a processor;
   a dispersion system disposed optically between the spatial filter and the detector system, the dispersion system configured to disperse images of the spatial filter in a wavelength dependent fashion onto the detector system;
   wherein a first set of images corresponding to a first spectral subset of wavelengths are dispersed in a first direction, wherein a second set of images corresponding to a second spectral subset of wavelengths are dispersed in the first direction, and wherein at least one of the images in the first set at least partially overlap, at the detector system, at least one of the images in the second set in a second direction different from the first direction; and
   wherein the detector system is configured to process detected images to distinguish signals associated with an image in the first set from signals associated with an overlapping image in the second set.

2. The spectrometer of claim 1 wherein the dispersion system is configured to two-dimensionally disperse images of the spatial filter in a wavelength dependent fashion onto the detector system.

3. The spectrometer of claim 2 wherein the dispersion system is configured to two-dimensionally disperse images of the spatial filter such that the first and second sets of images only partially overlap in the second direction.

4. The spectrometer of claim 2 wherein the spatial filter comprises a coded aperture configured to spatially filter incident light according to a coded aperture function.

5. The spectrometer of claim 4 wherein the processor is configured to process the detected images by applying an analysis function to one or more detector output signals corresponding to one or more images, wherein the analysis function complements the coded aperture function.

6. The spectrometer of claim 4 wherein the coded aperture is configured to create linearly independent spatial patterns in each image.

7. The spectrometer of claim 4 wherein the coded aperture function comprises a function defined by independent column codes.

8. The spectrometer of claim 4 wherein the coded aperture comprises a static transmission mask.

9. The spectrometer of claim 1 wherein the detector system filters the images in the first set according to a first passband corresponding to the first spectral subset, and wherein the detector system filters the images in the second set according to a second passband corresponding to the second spectral subset.

10. The spectrometer of claim 9 wherein the detector system comprises first and second filters disposed proximate the detector array, wherein the first filter is configured to optically filter the images in the first set according to the first passband, and wherein the second filter is configured to optically filter the images in the second set according to the second passband.

11. The spectrometer of claim 10 wherein the first filter is integrated with each detector element in a first set of detector array elements, and wherein the second filter is integrated with each detector element in a second set of detector array elements.

12. The spectrometer of claim 10 wherein the first filter is disposed optically upstream from the detector array and aligned with a first region of the detector array associated with the first spectral subset, and wherein the second filter is disposed optically upstream from the detector array and aligned with a second region of the detector array associated with the second spectral subset.

13. The spectrometer of claim 9 wherein the processor is configured to generate a first spectrum output based on detector output signals associated with the first filtered images, and wherein the processor is configured to generate a second spectrum output based on detector output signals associated with the second filtered images.

14. The spectrometer of claim 13 wherein the processor is configured to generate a combined spectrum output based on the first and second spectrum outputs.

15. The spectrometer of claim 14 wherein the first and second passbands partially overlap, and wherein the processor is configured to correct for the overlap between the first and second passbands before generating the combined spectrum output.

16. The spectrometer of claim 13 wherein the processor is configured to generate a plurality of spectral estimates for two or more wavelengths in the first and second spectral subsets based on the corresponding detector output signals, wherein the processor is configured to average the plurality of spectral estimates for two or more wavelengths in the first and second spectral subsets to generate wavelength-specific spectral estimates, and wherein the processor is configured to generate the first and second spectrum outputs based on the wavelength-specific spectral estimates.

17. The spectrometer of claim 9 wherein the images in the first set fully overlap the images in the second set.

18. The spectrometer of claim 9 wherein the detector system comprises a time varying filter configured to optically filter the images in the first set according to the first passband during a first time period and configured to optically filter the images in the second set according to a second passband during a second time period.

19. The spectrometer of claim 9 wherein each detector element in the detector array is manufactured with a light detecting material having a first absorption length associated with the first spectral subset and a second absorption length associated with the second spectral subset, and wherein each detector element is configured to output first and second detector output signals associated with the first and second spectral subsets.

20. The spectrometer of claim 9 wherein the spatial filter comprises a coded aperture configured to spatially filter incident light according to a coded aperture function, and wherein the dispersion system is configured to two-dimensionally disperse images of the coded aperture in a wavelength dependent fashion onto the detector system.

21. The spectrometer of claim 20 wherein the processor is configured to process the detected images by applying an analysis function to one or more detector output signals corresponding to one or more detected images, wherein the analysis function complements the coded aperture function.

22. The spectrometer of claim 1 wherein at least two of the images in the first set at least partially overlap in the first direction.

23. The spectrometer of claim 1 wherein the second direction is perpendicular to the first direction.

24. A method of processing light comprising:
spatially filtering incident light radiated from a source with a spatial filter;
dispersing the filtered light to shift images of the spatial filter in a wavelength dependent fashion onto a detector system such that a first set of images corresponding to a first spectral subset of wavelengths are dispersed in a first direction, such that a second set of images corresponding to a second spectral subset of wavelengths are dispersed in the first direction, and such that at least one of the images in the first set at least partially overlap at least one of the images in the second set in a second direction different from the first direction; and
processing output signals corresponding to two or more detected images to distinguish signals associated with an image in the first set from signals associated with an overlapping image in the second set.

25. The method of claim 24 wherein dispersing the filtered light comprises dispersing the filtered light in two dimensions.

26. The method of claim 25 wherein dispersing the filtered light comprises dispersing the filtered light such that the first and second sets of images only partially overlap in the second direction.

27. The method of claim 25 wherein spatially filtering the incident light with a spatial filter comprises spatially filtering the incident light with a coded aperture defined by a coded aperture function.

28. The method of claim 27 wherein processing the output signals comprises applying an analysis function to the output signals, wherein the analysis function complements the coded aperture function.

29. The method of claim 27 wherein spatially filtering the incident light with a coded aperture comprises creating linearly independent spatial patterns in the incident light.

30. The method of claim 24 further comprising, prior to processing the output signals:
filtering the images of the first set according to a first passband corresponding to the first spectral subset; and
optically filtering the images of the second set according to a second passband corresponding to the second spectral subset.

31. The method of claim 30 wherein filtering the images in the first set comprises optically filtering the images in the first set using a first filter having the first passband, and wherein filtering the images in the second set comprises optically filtering the images in the second set using a second filter having the second passband.

32. The method of claim 31 wherein the detector system includes a two-dimensional detector array, wherein the first filter is integrated with each detector element in a first set of detector array elements, and wherein the second filter is integrated with each detector element in a second set of detector array elements.

33. The method of claim 30 wherein processing output signals comprises generating a first spectrum output based on detector output signals associated with the images filtered according to the first passband, and generating a second spectrum output based on detector output signals associated with the images filtered according to the second passband.

34. The method of claim 33 wherein processing the output signals further comprises generating a combined spectrum output based on the first and second spectrum outputs.

35. The method of claim 34 wherein the first and second passbands overlap, and wherein processing the output signals further comprises correcting for the overlap between the first and second passbands before generating the combined spectrum output.

36. The method of claim 33 wherein generating the first spectral output comprises:
generating a plurality of spectral estimates for each of two or more wavelengths in the first spectral subset;
averaging the plurality of first spectral estimates for each of the two or more wavelengths to generate wavelength-specific spectral estimates; and
generating the first spectral output based on the wavelength-specific spectral estimates.

37. The method of claim 30 wherein dispersing the filtered light comprises dispersing the filtered light such that images in the first set fully overlap the images in the second set.

38. The method of claim 30 wherein the filtering the images of the first set comprises filtering the images of the first set during a first time period according to the first passband, and wherein filtering the images of the second set comprises filtering the images of the second set during a second time period according to the second passband.

39. The method of claim 30 wherein each detector element in the detector system is manufactured with a light detecting material having a first absorption length associated with the first spectral subset and a second absorption length associated with the second spectral subset, and wherein filtering the first and second images comprises outputting first and second signals from each detector element associated with the first and second spectral subsets based on first and second absorption lengths associated with the detected light.

40. The method of claim 30 wherein spatially filtering the incident light with a spatial filter comprises spatially filtering the incident light with a coded aperture defined by a coded aperture function, and wherein dispersing the filtered light comprises dispersing images of the coded aperture in two dimensions in a wavelength dependent fashion.

41. The method of claim 24 wherein spatially filtering the incident light and dispersing the filtered light onto the detector system comprises spatially filtering the incident light with a static spatial filter and dispersing the filtered light with a static dispersion system onto a static detector system.

42. An optical spectrometer comprising:
a coded aperture configured to spatially filter incident light according to a coded aperture function;
a two-dimensional detector array;
a dispersion system disposed optically between the coded aperture and the detector array, said dispersion system configured to two-dimensionally shift images of the coded aperture in a wavelength dependent fashion onto the detector array;
wherein a first image of the coded aperture associated with a first wavelength overlaps a second image of the coded aperture associated with a second wavelength at the detector array; and
a processor configured to estimate at least one property of the incident light by applying an analysis function to one or more detector array output signals corresponding to one or more detected images, wherein the analysis function complements the coded aperture function.

43. The spectrometer of claim 42 wherein the first image vertically overlaps the second image.

44. The spectrometer of claim 42 wherein the first image vertically and horizontally overlaps the second image.

45. The spectrometer of claim 42 further comprising a third image of the coded aperture associated with a third wavelength, wherein the third wavelength is chromatically arranged between the first and second wavelengths, and wherein the third image does not overlap the first image at the detector array.

46. The spectrometer of claim 42 wherein the coded aperture is configured to create linearly independent spatial patterns in the incident light.

47. The spectrometer of claim 42 wherein the coded aperture function comprises a function defined by independent column codes.

48. The spectrometer of claim 42:
wherein the first image vertically and horizontally overlaps the second image; and
further comprising a third image of the coded aperture associated with a third wavelength, wherein the third wavelength is chromatically arranged between the first and second wavelengths, and wherein the third image does not overlap the first image at the detector array.

49. The spectrometer of claim 48 wherein the coded aperture is configured to create linearly independent spatial patterns in the incident light.

50. The spectrometer of claim 48 further comprising a fourth image of the coded aperture associated with a fourth wavelength, wherein the fourth wavelength is chromatically arranged after said third wavelength, and wherein the fourth image overlaps the third image at the detector array.

51. The spectrometer of claim 42 wherein said coded aperture comprises a static transmission mask.

52. A method of processing light comprising:
spatially filtering incident light radiated from a source with a coded aperture defined by a coded aperture function;
dispersing the filtered light in two dimensions to shift images of the coded aperture in a wavelength dependent fashion onto a two-dimensional detector array such that a first image of the coded aperture associated with a first wavelength overlaps a second image of the coded aperture associated with a second wavelength at the detector array; and
processing one or more output signals corresponding to one or more detected images to remove ambiguity between one or more overlapping images.

53. The method of claim 52 wherein processing the one or more output signals comprises applying an analysis function to one or more output signals corresponding to one or more detected images, wherein the analysis function complements the coded aperture function.

54. The method of claim 52 wherein the first image vertically overlaps the second image.

55. The method of claim 54 wherein the first image vertically and horizontally overlaps the second image.

56. The method of claim 52 wherein spatially filtering the incident light comprises creating linearly independent spatial patterns in the incident light.

* * * * *